United States Patent [19]

Loewenthal

[11] 4,130,480
[45] Dec. 19, 1978

[54] APPARATUS FOR SORTING, COUNTING AND GROUPING ITEMS

[75] Inventor: Horst Loewenthal, Tiengen, Fed. Rep. of Germany

[73] Assignee: S I G Schweizerische Industrie-Gesellschaft, Neuhausen am Rheinfall, Switzerland

[21] Appl. No.: 797,399

[22] Filed: May 16, 1977

[30] Foreign Application Priority Data

May 14, 1976 [CH] Switzerland ..................... 6092/76

[51] Int. Cl.² ............................................. B07C 5/38
[52] U.S. Cl. .................................... 209/551; 209/644
[58] Field of Search ................. 209/73, 74 R, 111.7; 198/442

[56] References Cited

U.S. PATENT DOCUMENTS

| 2,340,775 | 1/1944 | Snyder | 209/90 |
| 3,072,253 | 1/1963 | Ridenour | 209/111.7 |
| 3,301,376 | 1/1967 | Winter et al. | 198/442 |
| 3,676,987 | 7/1972 | Gottweis et al. | 198/442 |

Primary Examiner—Allen N. Knowles
Attorney, Agent, or Firm—Spencer & Kaye

[57] ABSTRACT

An apparatus for the sorting, counting and grouping of successively conveyed items includes a conveyor arrangement defining a conveying path; at least one sorting device disposed along the conveying path for removing defective items; a counting device disposed along the conveying path downstream of the sorting device for counting the items unaffected by the sorting device; at least two branch conveyors forming the conveying path downstream of the counting device; a routing device arranged along the conveying path upstream of the branch conveyors and actuated by the counting device for directing a predetermined number of items into selected branch conveyors; a stacking device disposed at the downstream end of the branch conveyors for stacking the items to form item groups each consisting of the predetermined number of items; and a collecting conveyor forming the conveying path downstream of the stacking device for further advancing the item groups.

17 Claims, 10 Drawing Figures

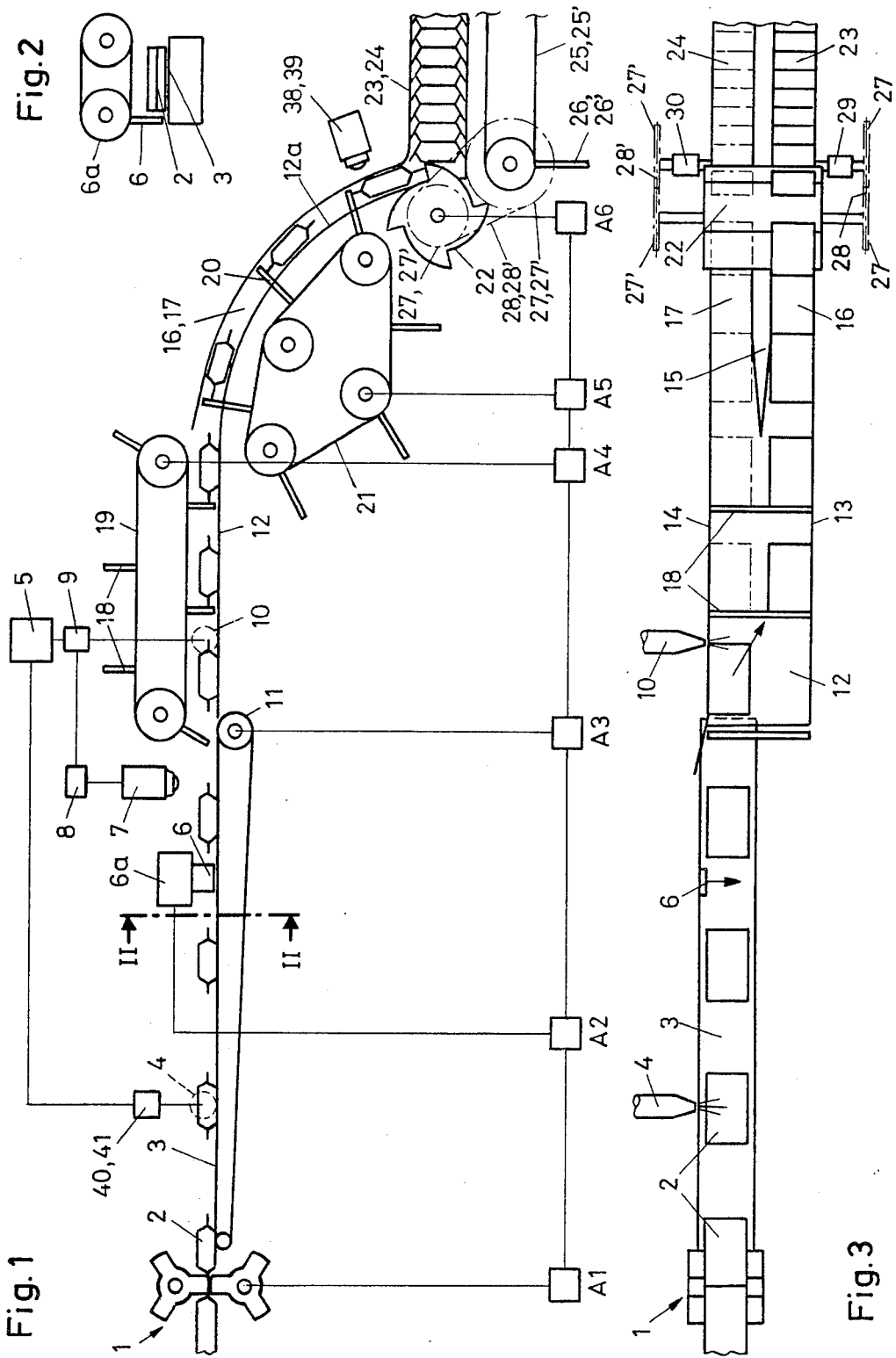

APPARATUS FOR SORTING, COUNTING AND GROUPING ITEMS

BACKGROUND OF THE INVENTION

This invention relates to the sorting, counting and grouping of conveyed items, particularly wrapped packages containing one or more articles, such as cookies or biscuits.

Flat articles such as biscuits, cookies or the like are conventionally packed individually or in small groups in hose-like wrappers. These packages have projecting, welded flaps at two oppositely located edges. Thereafter, the individual, elemental packages are, in exactly counted quantities, united into larger, combined packages. Since not all the packages delivered by a wrapping machine are in an acceptable condition (occasionally empty wrapping sleeves are discharged by the wrapping machine or two or more successive packages are not entirely severed from one another at their flaps), they have to be carefully monitored and the unacceptable ones separated before they are counted and gathered into combined packages.

Heretofore it has not been possible to perform the monitoring, separating, counting and grouping of the elemental packages in a fully automatic manner. These operations had to be performed in part manually by labor which has caused a substantial increase in the manufacturing costs.

SUMMARY OF THE INVENTION

It is an object of the invention to provide an apparatus with which the above-noted manual operations can be performed in a fully automatic manner to thus ensure the automation of the entire wrapping operation. More particularly, it is an object of the invention to provide an apparatus in conjunction with a wrapping machine for supervising, sorting, counting and grouping packages forwarded in a spaced and sequenced manner and to forward the counted groups — voided of defective packages — to an additional processing station.

The above objects and others to become apparent as the specification progresses, are accomplished by the invention, according to which, briefly stated, the apparatus for the sorting, counting and grouping of successively conveyed items includes a conveyor arrangement defining a conveying path; at least one sorting device disposed along the conveying path for removing defective items; a counting device disposed along the conveying path downstream of the sorting device for counting the items unaffected by the sorting device; at least two branch conveyors forming the conveying path downstream of the counting device; a routing device arranged along the conveying path upstream of the branch conveyors and actuated by the counting device for directing a predetermined number of items into selected branch conveyors; a stacking device disposed at the downstream end of the branch conveyors for stacking the items to form item groups each consisting of the predetermined number of items; and a collecting conveyor forming the conveying path downstream of the stacking device for further advancing the item groups.

Expediently, along the conveying path there is provided a sorting device formed of an air nozzle directed perpendicularly to the direction of conveyance and operating with a continuous or intermittent air blast to blow away empty wrappers in a direction transverse to the direction of conveyance.

In order to eliminate those adjoining packages which are not fully severed from one another, along the conveying path, there is expediently provided a further sorting device formed of a pusher oriented transversely to the direction of conveyance and intermittently reaching into the space between successive packages.

In accordance with a preferred embodiment of the invention, along the conveying path there is provided, downstream of the above-outlined two sorting devices, a sensor such as a light barrier for counting the packages which pass by. The pulses generated by the sensor are applied to a counter which switches a routing device after a predetermined number of pulses.

For forming a group of counted and verified packages, according to a preferred embodiment of the invention, in the conveying path, in the zone of the branch conveyors downstream of the counter, there is provided a conveyor arrangement having carrier members which engage between the packages from above and which are mounted, for example, on an endless chain. Further, at the upstream end of the branch conveyors there is arranged a routing device formed of at least one air nozzle oriented transversely to the direction of conveyance and controlled by the counting device. The routing device, by means of controlled air blasts, detours the packages from their incoming path into a selected second path of conveyance.

BRIEF DESCRIPTION OF THE DRAWINGS

FIG. 1 is a schematic side elevational view of a preferred embodiment of the invention.

FIG. 2 is a schematic end elevational view of a component taken along line II—II of FIG. 1.

FIG. 3 is a schematic top plan view of the apparatus shown in FIG. 1.

DESCRIPTION OF THE PREFERRED EMBODIMENTS

Figure 4:
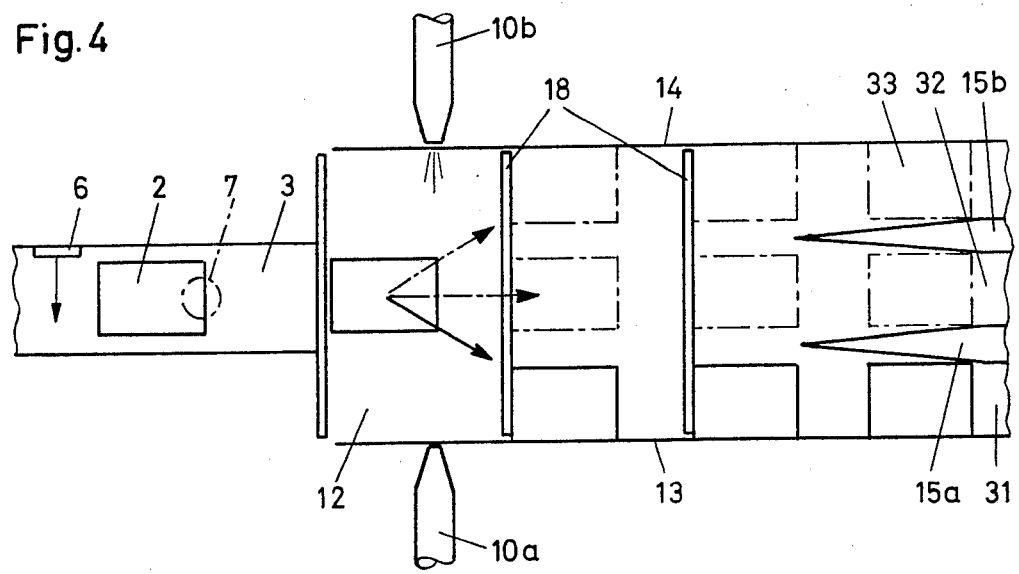
FIG. 4 is a schematic top plan view of a variant of one part of the apparatus shown in FIGS. 1 and 2.

Turning now to FIGS. 1-3, the apparatus shown therein adjoins the discharge end of a wrapping machine, of which only the rotary welding and severing shoe pair 1 is illustrated. The device 1 provides, in a known manner, transversal seams and severs the same, transversely to the feed direction, along a central line between two adjoining packages. The severed packages 2 are then advanced on an endless conveyor belt 3 which travels slightly faster than the circumferential speed of the welding and severing shoe pair 1, thus causing the spacing between subsequent packages 2 to increase. The conveyor belt 3 advances the packages 2 past a first sorting device constituted by a laterally arranged blower nozzle 4 which is connected with a source of pressurized air 5 and emits continuously or intermittently an air jet oriented transversely to the direction of conveyance. The force of the air jet is so calculated that it is capable of laterally blowing away empty wrappings while it has no effect on filled packages.

Along the conveyor belt 3 there is arranged a second sorting device constituted by a pusher assembly 6, 6a, 6b which is illustrated in detail in FIG. 2. The pusher 6 is secured to an endless chain 6a which is trained about sprockets 6b. The movement of the pusher 6 is timed in such a manner that it runs across the conveying path in the intended intermediate space between two successive packages 2. In case the successive packages 2 are fully severed from one another, the pusher 6 has no effect thereon. If, however, two or more successive packages are connected to one another, that is, they are not fully severed from one another, the pusher 6 displaces them laterally with respect to the direction of conveyance and thus eliminates them from the packages to be further conveyed.

Downstream of the sorting device 6, 6a and 6b there is arranged, still within the range of the conveyor belt 3, a sensor head 7 which may constitute a light barrier known by itself. The sensor head generates a pulse as a package 2 passes by and applies the pulses to a counting device 8. The latter adds the pulses and, according to a predetermined program, actuates a routing device after a predetermined count is reached. In the embodiment shown in FIGS. 1 and 2, the routing device is constituted by a laterally arranged blow nozzle 10 which is coupled to the source of pressurized air 5 by the intermediary of a valve 9.

Downstream of the support roller 11 engaging the conveyor belt 3 at its discharge terminus, there is arranged a slide 12 which is bounded laterally by guide walls 13 and 14. The slide 12 is slightly wider than twice the width of a package 2 and is, at a predetermined distance from the blow nozzle 10, divided into two channels (branch conveyors) 16 and 17 by a central wall 15. The slide 12 is horizontal at its upstream end, while it slopes downwardly at its downstream portion 12a. The conveyance of the individual packages 2 is taken over in the horizontal zone of the slide 12 by carrier members 18 which are secured to an endless chain 19 above the slide 12. The conveyance of the packages 2 is effected in the sloping zone 12a of the slide 12 by carriers 20 which are secured to an endless chain 21 underneath the slide portion 12a.

At the downstream end of the slide portion 12a there is arranged a stacker wheel 22 of a structure known by itself which receives the packages 2 arriving on the slide portion 12a and pushes them, in an upright orientation, into one of the collecting channels 23 or 24. Underneath the collecting channels 23 and 24 there are provided, respectively, endless chains 25, 25' with respective carrier members 26, 26' which advance the stacked packages to a further processing station as soon as the predetermined number of packages (items) is stacked in one of the channels 23 or 24, as the case may be.

The drive of the individual conveying devices, the pusher 6 and the stacker wheel 22 is effected, as indicated schematically in FIG. 1, by the welding and severing shoe pair 1 of the wrapping machine with the intermediary of symbolically illustrated gear connections A1, A2, A3, A4, A5 and A6. The two conveying devices 25, 26 and 25', 26' associated with the respective channels 23 and 24 are driven by the stacking wheel 22 separately by means of sprocket wheels 27 meshing with a chain 28 and, respectively, by means of sprockets 27' meshing with a chain 28'. Clutches 29 and 30 are interposed, respectively, between the sprocket drive 27 and the conveying device 25 and between the sprocket drive 27' and the conveying device 25'. The clutch 29 or 30, as the case may be, is engaged if the stacked group is complete in number, so that the conveying devices 25, 26 or, as the case may be, 25', 26' advance the completed groups to a further processing station.

Figure 10:
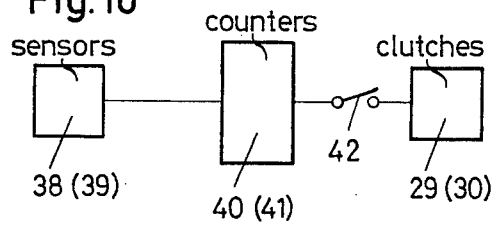

The clutches 29 and 30 (FIGS. 3 and 10) are engaged and disengaged electrically. Sensors 38, 39 which are located in the back of the slide portions 12a are provided for each of the channels 16 and 17. These sensors 38, 39 generate signals as the packages move past, and the signals are sent to the counting devices 40, 41 where they are added. The counting devices may be arranged in such a manner, that the electric circuit of either the clutch 29 or 30 is shut off after a predetermined member of packages have been counted. The clutches are disengaged and engaged in and alternating manner. Thus the circuit of the clutch 29 will be shut off and the clutch disengaged by a switch 42 when the conveying device 26' for a group of packages stacked alongside is ready.

In the description which follows, the operation of the above-described apparatus will be set forth.

After the defective packages 2 have been separated by the blow nozzle 4 and the sorting pusher 6 from the conveyor belt 3, the sensor head 7 generates a pulse as each accepted package 2 moves past. The pulses generated by the sensor head 7 are applied to the counting device 8 where they are added. Assuming now that the packages 2 passing under the sensor head 7 should be, as illustrated in FIG. 3, forwarded to the channel 16, the blow nozzle 10 is, by proper actuation of the valve 9, in communication with the source of pressurized air 5. The air jet emitted by the blow nozzle 10 shifts the packages 2 — already advanced by the carriers 18 — against the wall 13 of the channel 16. These packages are then further conveyed along the guide wall (retaining wall) 13 and thus automatically enter the channel 16 aligned with the conveying path extending alongside the guide wall 13. Subsequently, at the downstream (discharge) end of the channel 16 the items 2 are stacked in the collecting channel 23 by the stacking wheel 22.

After a predetermined number of packages 2, for example twenty, has passed the sensor head 7, the counter 8 shuts off the valve 9. The next twenty packages then proceed unaffected by the blow nozzle 10 in a straight line along the guide wall 14 into the channel 17 and are subsequently stacked by the stacker wheel 22 in the channel 24. Thereafter the blow nozzle 10 is again actuated whereupon the next twenty packages are advanced again to the channel 16.

Turning now to FIG. 4, there is illustrated a variant of the routing device shown in FIGS. 1 and 2. In accordance with the modification illustrated in FIG. 4, the routing device directs the incoming packages 2 in predetermined quantities alternately into three parallel channels (branch conveyors). The conveyor belt 3, the sorting devices 4 and 6 and the sensor head 7 are structured identically to that of the first embodiment. The slide 12 with the lateral guide walls 13 and 14, however, is of wider structure. Instead of the single central wall 15 of the first embodiment there are provided two intermediate walls 15a and 15b which, together with the guide walls 13 and 14 define three channels 31, 32 and 33. At both guide walls 13 and 14 there are provided at least one laterally oriented blow nozzle 10a or 10b, the air jets of which are directed transversely to the direction of conveyance in an alternating manner against the incoming packages 2.

In case none of the blow nozzles 10a or 10b operates, the packages 2 advance into the middle channel 32. If the blow nozzle 10a is operative, the packages 2 are directed into the channel 33, while in case the blow nozzle 10b is operative, the packages are directed into the channel 31. The stacking wheel (not shown in FIG. 4) accordingly advances the packages into a selected one of three collecting channels which are, in an alternating manner, emptied by a conveyor device.

Figure 5:
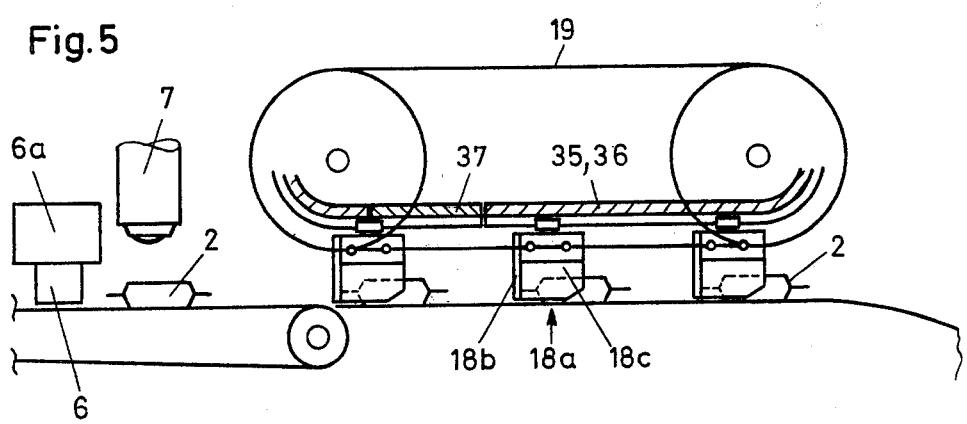
FIG. 5 is a schematic side elevational view of another variant of one part of the apparatus shown in FIGS. 1 and 2.
Figure 6:
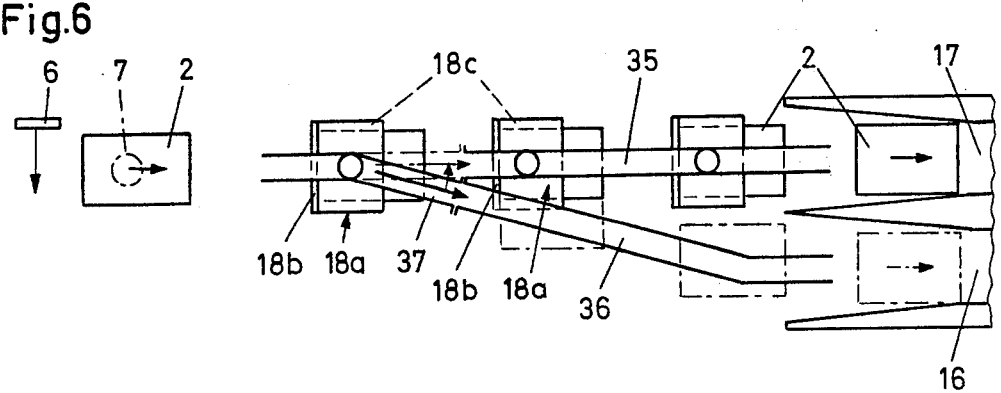
FIG. 6 is a schematic top plan view of the arrangement shown in FIG. 5.

Turning now to FIGS. 5 and 6, there is illustrated a further variant of a routing device. The other parts of the apparatus with the exception of the conveying members 18 and 19 correspond to those described above. Instead of the firmly attached carrier devices 18 of the first two embodiments, in the embodiment shown in FIGS. 5 and 6, carrier devices 18a are secured to the endless chain 19 in such a manner that they are displaceable transversely to the direction of conveyance. Each carrier device 18a has a wall 18b arranged transversely to the direction of conveyance and a wall 18c which adjoins the wall 18b and which extends in the direction of conveyance. In the zone of the lower flight of the chain 19, the carrier devices 18a are guided in guide rails 35 or 36. A pivotal guide router 37 guides the carrier devices 18a and thus directs the packages 2 engaged by the carrier devices 18a, either over the straight guide rail 35 into the channel 17 or over the oblique guide rail 36 into the channel 16. The sensor head 7 controls the position of the guide router 37 by the intermediary of the counter 8 (not shown in FIGS. 5 and 6).

It is to be understood that individual components of the apparatus may be of structures different from that described above. For example, instead of sorting pushers 6, two light barriers may be provided which are arranged spaced from one another in the direction of conveyance and which cause an ejecting device to operate if there is no clearance between two successive packages. Further, the correct dimensions of the packages may be determined by means of a sensor. If sorting pushers 6 are used, the conveyor belt 3 is expediently only slightly wider than the packages so that the transversal motion of the pusher 6 need not be large. Instead of the above-described three variants of the routing device it is feasible to utilize, for example, a pivotal gate or other arrangements.

As has previously been mentioned, the nozzle 4 may also operate in an alternating manner. In order to achieve this, a valve disc with apertures is provided which is driven by at least one drive axle of the rotary welding and severing shoe pair 1. The valve disc is rotated in such a manner that the nozzle 4 is connected to the compressed air source 5 each time that a package is moved past the nozzle.

Figure 7:
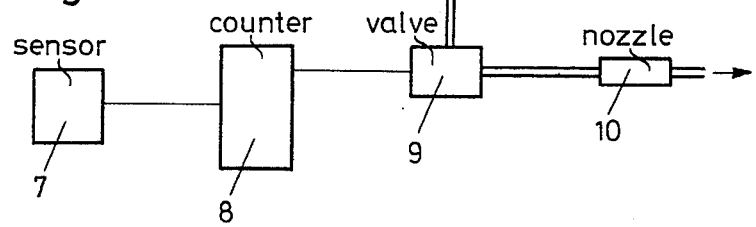
FIGS. 7 to 10 show block diagrams of various control devices.

FIG. 7 shows how the nozzle 10 of FIG. 1 is activated. The sensor 7 generates a pulse and applies it to the counting device 8 for each package which passes by. If, for example, groups of 20 packages are to be stacked, the counting device 8 is preset in such a manner that the first 20 entering pulses generate 20 slightly delayed outgoing pulses which keep valve 9 open, so that the nozzle 10 remains connected to the compressed air source 5, thus allowing a first group of packages to be stacked in channel 23. The pulses from the 21st package onwards are registered in the counting device, but do not generate outgoing pulses until a total of 40 packages have been counted. The valve is shut off and the connection between the nozzle 10 and the compressed air source 5 is closed, so that the second group of twenty packages will be moved into channel 24.

Figure 8:
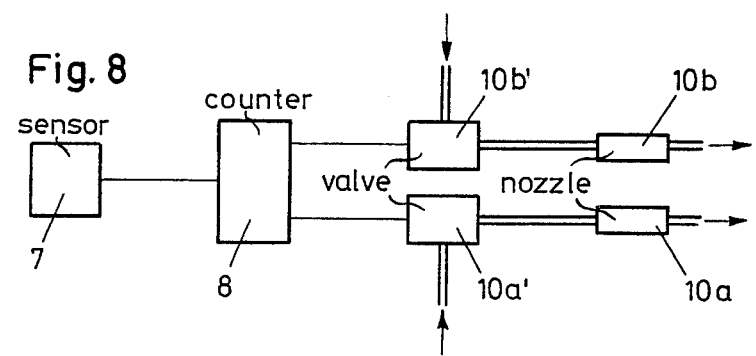

From FIG. 8 it may be seen, how the nozzles 10a and 10b according to the embodiment of FIG. 4 are controlled. For the first group of 20 packages the counting device 8 sends outgoing pulses to the valve 10b' for operating the nozzle 10b, thus allowing the packages to be stacked in channel 31. For the next group of packages numbered 21 to 40, no outgoing pulses are generated, so that the packages proceed into channel 32. For the subsequent group of packages 41 to 60 an outgoing pulse is sent to valve 10a' for operating the nozzle 10a, so that these packages are moved into channel 33.

Figure 9:
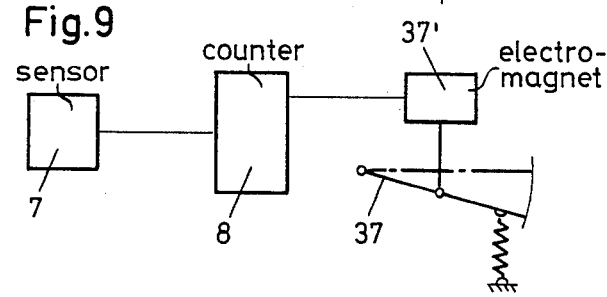

In FIG. 9 it is shown how the guide router 37 according to the embodiment of FIG. 6 is controlled with an electromagnet 37'. The electromagnet 37' is activated in a manner similar to the control device of FIG. 7.

It will be understood that the above description of the present invention is susceptible to various modifications, changes and adaptations, and the same are intended to be comprehended within the meaning and range of equivalents of the appended claims.

What is claimed is:

1. An apparatus for sorting, counting and grouping items, including conveyor means, defining a conveying path, for advancing the items in succession, comprising
   (a) sorting means disposed along said conveying path for removing defective items and including a pusher device supported along said conveying path for periodical movement transversely to said conveying path between successive items for laterally removing interconnected successive items from said conveyor means;
   (b) counting means disposed along said conveying path downstream of said sorting means for counting the advancing items unaffected by said sorting means;
   (c) at least two branch conveyors forming part of said conveyor means and defining said conveying path downstream of said counting means;
   (d) a routing device arranged along said conveying path upstream of the branch conveyors and downstream of said counting means for directing the items onto a selected one of said branch conveyors; said counting means being connected to said routing device for switching said routing device upon reaching a predetermined count for alternatingly directing a predetermined number of items onto separate branch conveyors;
   (e) stacking means arranged at downstream ends of said branch conveyors for stacking the items into item groups each consisting of the predetermined number of items; and
   (f) collecting conveyor means forming part of said conveyor means and defining said conveying path downstream of said stacking means for advancing the item groups.

2. An apparatus as defined in claim 1, wherein said counting means comprises a sensor supported along said conveying path downstream of said sorting means for generating a pulse upon passage of an item through a zone of response of said sensor, and a counter connected to said sensor for adding the pulses generated by said sensor; said counter being connected to said routing device for switching said routing device upon reaching a predetermined count.

3. An apparatus as defined in claim 1, wherein said routing device comprises a blow nozzle supported along said conveying path upstream of said branch conveyors and oriented to emit an air jet transversely to said conveying path for laterally shifting the items out of alignment with one of said branch conveyors and into alignment with another of said branch conveyors; said blow nozzle being connected to a source of pressurized air and to said counting means; said counting means controlling operative and idle periods of said blow nozzle.

4. An apparatus as defined in claim 1, wherein the number of said branch conveyors is three, one being a middle branch conveyor and the other two being flanking branch conveyors; and wherein said routing device comprises at least two blow nozzles supported along said conveying path upstream of said branch conveyors and oriented to emit air jets in opposite directions transversely to said conveying path for laterally shifting the items out of alignment with the middle branch conveyor and into alignment with one of said flanking branch conveyors; said blow nozzles being connected to a source of pressurized air and to said counting means; said counting means controlling operative and idle periods of said blow nozzles.

5. An apparatus as defined in claim 1, wherein said sorting means comprises a blow nozzle supported along said conveying path and oriented to emit an air jet transversely to said conveying path for laterally blowing away empty wrappers and a source of pressurized air coupled to said blow nozzle.

6. An apparatus as defined in claim 5, further comprising means for effecting an intermittent emission of air from said blow nozzle.

7. An apparatus as defined in claim 1, wherein said conveyor means comprises a conveying mechanism having a plurality of carrier members spaced along the direction of said conveying path and along a portion of said conveying path in the zone of said routing device and upstream of said branch conveyors, and means for supporting and moving said carrier members above and along said portion of said conveying path; said carrier members engaging the items by extending into the conveying path from above.

8. An apparatus as defined in claim 7, wherein said means for supporting and moving said carrier members comprises an endless chain supported above the respective conveyor channel by spaced sprockets.

9. An apparatus for sorting, counting and grouping items, including conveyor means, defining a conveying path, for advancing the items in succession, comprising
   (a) sorting means disposed along said conveying path for removing defective items;
   (b) counting means disposed along said conveying path downstream of said sorting means for counting the advancing items unaffected by said sorting means;
   (c) at least two branch conveyors forming part of said conveyor means and defining said conveying path downstream of said counting means;
   (d) a routing device arranged along said conveying path upstream of the branch conveyors and downstream of said counting means for directing the items onto a selected one of said branch conveyors; said routing device including
      (1) a plurality of carrier members spaced along the direction of the conveying path and extending into the conveying path for engaging and advancing the items;
      (2) support means for supporting and moving said carrier members along the conveying path; said carrier members being arranged for lateral displacement with respect to said support means;
      (3) guide rails extending along said conveying path and each being aligned with a separate one of said branch conveyors for guiding said carrier members; and
      (4) a movable guide router arranged at an upstream end of said guide rails for directing said carrier members to a selected one of said guide rails; said guide router being connected to said counting means for switching said guide router from one of said guide rails to another upon reaching said predetermined count for alternatingly directing a predetermined number of items onto separate branch conveyors;
   (e) stacking means arranged at downstream ends of said branch conveyors for stacking the items into item groups each consisting of the predetermined number of items; and
   (f) collecting conveyor means forming part of said conveyor means and defining said conveying path downstream of said stacking means for advancing the item groups.

10. An apparatus for sorting, counting and grouping items, including conveyor means, defining a conveyor path, for advancing the items in succession, comprising
   (a) sorting means disposed along said conveying path for removing defective items;
   (b) counting means disposed along said conveying path downstream of said sorting means for counting the advancing items unaffected by said sorting means;
   (c) at least two branch conveyors forming part of said conveyor means and defining said conveying path downstream of said counting means; each said branch conveyor including a conveyor channel in which the items advance; each said conveyor channel having a downstream terminal portion inclining downwardly in the downstream direction;
   (d) a routing device arranged along said conveying path upstream of the branch conveyors and downstream of said counting means for directing the items onto a selected one of said branch conveyors; said counting means being connected to said routing device for switching said routing device upon reaching a predetermined count for alternatingly directing a predetermined number of items onto separate branch conveyors;
   (e) stacking means arranged at downstream ends of said branch conveyors for stacking the items into item groups each consisting of the predetermined number of items; and
   (f) collecting conveyor means forming part of said conveyor means and defining said conveying path downstream of said stacking means for advancing the item groups.

11. An apparatus as defined in claim 8, wherein each said branch conveyor further comprises a conveying mechanism for advancing the items in the conveyor channel.

12. An apparatus as defined in claim 11, wherein each said conveying mechanism comprises a plurality of carrier members spaced along the direction of said conveying path and means for supporting and moving said carrier members along at least one part of the respective conveyor channel to said stacking means for introducing the items into said stacking means.

13. An apparatus as defined in claim 12, wherein said means for supporting and moving said carrier members comprises an endless chain supported by sprockets.

14. An apparatus as defined in claim 10, wherein said stacking means comprises a stacking wheel arranged at downstream ends of said conveyor channels for receiving the items therefrom.

15. An apparatus as defined in claim 14, wherein said collecting conveyor means comprises at least two collecting channels each having an upstream end adjoining said stacker wheel for receiving the item groups therefrom.

16. An apparatus as defined in claim 15, further comprising additional conveying mechanisms associated with each collecting channel for advancing the item groups.

17. An apparatus as defined in claim 16, wherein each said additional conveying mechanism comprises carrier members secured in a spaced relationship to an endless chain arranged underneath each respective collecting channel along the direction of said conveying path.

* * * * *